United States Patent [19]

Morris et al.

[11] 4,158,878

[45] Jun. 19, 1979

[54] MEANS FOR ELECTRICALLY CONTACTING FLASH LAMP HAVING EXTERNAL CONDUCTIVE COATING

[75] Inventors: James C. Morris, Wakefield; P. Bruce Newell, Carlisle; John A. Scholz, Danvers, all of Mass.

[73] Assignee: GTE Sylvania Incorporated, Stamford, Conn.

[21] Appl. No.: 873,376

[22] Filed: Jan. 30, 1978

[51] Int. Cl.[2] .............................................. G03B 15/02

[52] U.S. Cl. ........................................ 362/3; 431/360; 431/362

[58] Field of Search .................... 362/3, 6; 431/97, 98

[56] References Cited

U.S. PATENT DOCUMENTS 2,745,945 5/1956 Blount ................................ 362/3 X

*Primary Examiner*—Stephen J. Lechert, Jr.

*Attorney, Agent, or Firm*—Lawrence R. Fraley

[57] ABSTRACT

Several means are described for providing an electrical coupling path through a protective, insulative layer, e.g. cellulose acetate, located on an electrically activated flash lamp envelope. The function of the path is to interconnect a thin conductive coating positioned on the envelope's external surface under the insulative layer with an electrical contact located externally of the flash lamp and adapted for igniting the lamp.

10 Claims, 6 Drawing Figures

MEANS FOR ELECTRICALLY CONTACTING FLASH LAMP HAVING EXTERNAL CONDUCTIVE COATING

CROSS REFERENCE TO CO-PENDING APPLICATIONS

An application entitled "Single Lead Electrically Activated Flash Lamp" (Inventors: P. B. Newell et al) was filed Jan. 30, 1978 and assigned to the same assignee as the present invention. This application is listed under Ser. No. 873,250 and defines a single lead flash lamp which has an external conductive layer capacitively coupled to the lamp's filamentary material.

An application entitled "Leadless Electric Flash Lamp Assembly" (Inventor: T. Fohl) was also filed Jan. 30, 1978 and is listed under Ser. No. 873,378. Ser. No. 873,378 is assigned to the same assignee as the instant Application and defines a flash lamp assembly for use with a camera and which utilizes leadless flash lamps.

Still another application was filed Jan. 30, 1978 and is entitled "Leadless Electric Flash Lamp" (Inventor: T. Fohl). This application is listed under Ser. No. 873,258 and defines a leadless, electrically-activated flash lamp which, in one embodiment, utilizes a pair of spaced conductice coatings on the lamp's external surface. These lamps are capable of being used within the assembly defined above in Ser. No. 873,378.

BACKGROUND OF THE INVENTION

The invention relates to chemical flash lamps and particularly to flash lamps which are electrically activated.

As described, many of the flash lamps defined in the above co-pending applications employ at least one thin conductive coating, e.g. tin oxide, on the exterior surface of the lamp's envelope. Accordingly, when an electrical pulse is supplied to these coatings, such as through a resilient contact in engagement therewith, activation of the lamp is achieved. In those lamps utilizing a single lead within the envelope, firing is achieved by applying the needed activating potential across the lead and the external conductive coating. In leadless lamps, activation may be accomplished by developing the required potential across a pair of coatings spacedly oriented on the envelope's external surface.

Typical chemical flash lamps, including those described above, include a quantity of combustible material such as shredded zirconium or hafnium within the lamp's hermetically sealed glass envelope. A combustion-supporting gas such as oxygen is also provided within the envelope and established at a pressure well above one atmosphere. During lamp flashing, the glass envelope is subjected to severe thermal shock and, as a result, cracks and crazes occur within the glass. At high internal pressures, containment of the glass becomes practically impossible. In order to reinforce the glass and improve its containment capability it has been common practice to apply a protective, insulative layer or coating about the envelope's external surface. Several methods are utilized in the industry, including dipping, fluidized bed coating, spraying, and even vacuum-drawing a preformed polycarbonate sleeve about the envelope. Of the above, the preferred method is dipping wherein the envelope is dipped several times in a lacquer solution containing a solvent and a selected resin such as cellulose acetate. After each dip, the lamp is dried to permit evaporation of the solvent and leave the desired plastic resin coating.

The presence of an insulative plastic layer or polycarbonate sleeve over the conductive coatings in the aforementioned leadless and single lead lamps presents a problem, however, when providing the necessary electrical connection to the conductor. As described in the above co-pending applications, the method used requires removal of a portion of the coating in the region above the conductive coating where contact is desired. This method has disadvantages, however, in that additional manufacturing steps, e.g., masking, are required. Such a process is both time-consuming and expensive from a production standpoint. Even further, the absence of portions of the protective coatings may result in the described containment problems occurring within these regions.

It is believed, therefore, that an improved coupling path through an insulative layer on a flash lamp envelope for enhancing electrical connection between a conductive coating located under the layer and a contact located externally of the lamp would constitute an advancement in the art.

OBJECTS AND SUMMARY OF THE INVENTION

It is therefore a primary object of this invention to enhance the chemical flash lamp art by providing an improved coupling path between the lamp's outer conductive film and an external contact utilized to activate the lamp.

In accordance with one aspect of the invention, an improved flash lamp is described which is adapted for being activated by an external conducting member when said member electrically contacts a thin, conductive coating located on the outer surface of the lamp'envelope.

DETAILED DESCRIPTION OF THE PREFERRED EMBODIMENTS

For a better understanding of the present invention together with other and further objects, advantages and capabilities thereof, reference is made to the following disclosure and appended claims in connection with the above described drawings.

Figure 1:
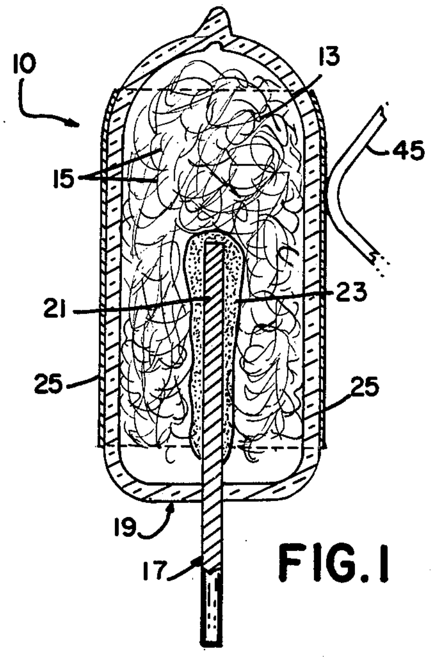
FIG. 1 is a side elevational view representing one example of a chemical flash lamp having an external conductive coating thereon.

With particular reference to FIG. 1, there is shown one example of a chemical flash lamp 10 which is adapted for being electrically activated. By a chemical flash lamp is meant a lamp having a light-transmitting envelope 11 defining a chamber 13 therein and including a quantity of filamentary, combustible material 15 and a combustion-supporting atmosphere therein. Envelope 11 is preferably comprised of glass, combustile material 15 is either shredded zirconium or hafnium, and the supporting atmosphere is preferably oxygen. Lamp 10 is similar to the lamp shown in the copending application under Ser. No. 873,250 and includes a single conductive lead member 17 secured to and extending from an end 19 envelope 11. An end portion 21 of lead 17 projects within envelope 11 and includes a quantity of primer material 23 thereon. Lead 11 and primer 23 are comprised of materials known in the flash lamp art and further description is not believed necessary. Lamp 10 further includes a conductive coating 25 e.g., tin oxide or indium oxide, located on the external surface of envelope 11 and in capacitive coupled relationship to the conductive filamentary material 15 within the envelope. Accordingly, activation of lamp 10 is accomplished by establishing a suitable potential, e.g. between 1000 and 3000 volts, across lead 17 and coating 25. A positive electrical connection to coating 25 is provided by external contact 45 which is electrically joined to remaining parts of the circuitry required to assure lamp firing. Because such circuitry is well understood in the art and does not constitute a part of the present invention, further description is not believed necessary.

As described above, it is common practice in the flash lamp industry to substantially encapsulate the lamp's envelope with a protective, insulative material as a means of additionally strengthening the glass envelope as well as improving containment thereof during lamp ignition. A problem exists, however, when such a material (in the form of a dipped, sprayed or fluidized bed coating, or a preformed polycarbonate sleeve) covers the conductive coating 25 in lamps such as shown in FIG. 1. Accordingly, the present invention defines several means for providing an electrical coupling path through a localized region of the protective, insulative layer located atop the conductive coating to thus assure a positive connection between the conductive coating and an external conducting member, such as contact 45. It is of course understood, that the several means of the present invention may be utilized with any flash lamp employing at least one external conductive coating thereon and is thus not limited solely to the type of lamp shown in FIG. 1.

Figure 2:
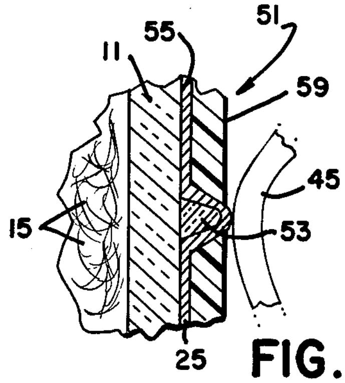
FIGS. 2–6 are partial, side elevational views, in section, depicting various means for providing electrical coupling paths through an insulative layer on a flash lamp, in accordance with preferred embodiments of the invention.

With particular regard to FIG. 2, there is shown a means 51 for providing a coupling path in accordance with a preferred embodiment of the invention. Means 51 comprises a protuberance 53 located on the external surface 53 of envelope 11. For reasons of simplicity, only a portion of envelope 11 is shown, including a filamentary combustible material 15. Protuberance 53 is preferably a glass bead affixed to surface 55 prior to application of the conductive coating 25. Accordingly, a portion of coating 25 extends through the subsequently applied protective layer 59 to make contact with member 45. Bead 53 is fused to the side of envelope 11 utilizing well known glass working techniques and, in one embodiment of the invention, protrudes a distance of about 0.015 inch above surface 55. The thickness of protective layer 59 is about 0.010 inch. Accordingly, coating 25 has a thickness such that its surface resistivity is within the range of about 100 to 50,000 ohms per square. In accordance with another aspect of the invention, protuberance 53 could comprise a metallic or similar member of sound conductive material secured (e.g. cemented using a silver paint) to envelope 11 either before or subsequent the application of coating 25. Preferred materials of such a member include copper and aluminum.

Figure 3:
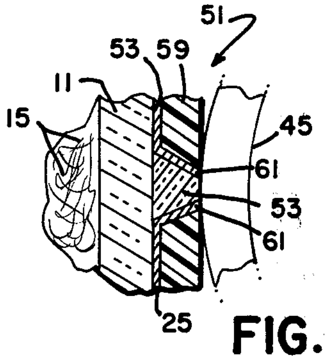

FIG. 3 represents another embodiment of the invention somewhat similar to that of FIG. 2. In FIG. 3, however, the extending portion of coating 25 has been removed, e.g. abraded, such that only an annular portion 61 thereof is exposed and adapted for engaging contact 45.

Figure 4:
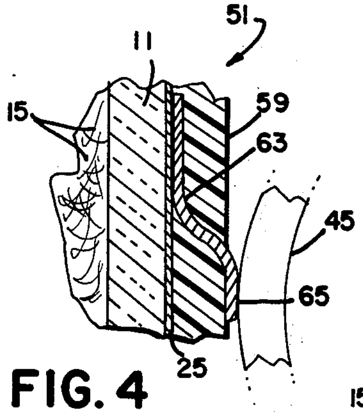

In FIG. 4, means 51 comprises a conductive wire 63 cemented to coating 25 afterwhich layer 59 is applied. Wire 63 is preferably of rectangular cross-sectional configuration and in one form of the invention comprised a strip of copper foil having a width of 0.030 inch and a thickness of about 0.005 inch. An end 65 of wire 63 protrudes from layer 59 to make contact with member 45.

Figure 5:
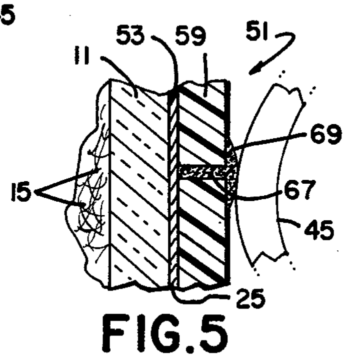

In the embodiment of FIG. 5, a 0.125 inch long slit 67 was made in layer 59 and a quantity of electrically conductive material 69 located therein. Material 69 is preferably a conductive silver paint which penetrates the slit 67 by capillary action to contact coating 25. the paint subsequently dries and a portion thereof remains on the external surface of layer 59 to effect contact with member 45. Testing of this form of contact was possible by making a similar contact on the opposite side of the lamp's envelope and measuring the continuity therebetween.

Figure 6:
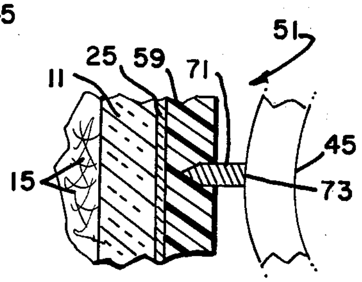

Still another embodiment of the invention is depicted in FIG. 6 wherein an electrically conductive pin 71 is partially embedded within the applied layer 59 a sufficient distance to permit electrical breakdown through the portion of layer 59 between the pin and coating 25. When using the aforementioned activating voltages (1000–3000 volts), gaps of up to about 0.003 inch between the tip of pin 71 and coating 25 are permissible. Pin 71 is preferably a copper cylindrical component having a 0.030 inch diameter and including a tail end portion 73 which protrudes from layer 59 to make contact with member 45.

While there have been shown and described what are at present considered the preferred embodiments of the invention, it will be obvious to those skilled in the art that various changes and modifications may be made therein without departing from the scope of the invention as defined by the appended claims.

What is claimed is:

1. In a flash lamp adapted for being electrically activated by an electrical conducting member located externally of said flash lamp wherein said flash lamp includes an envelope having a thin, external conductive coating thereon and a protective, insulative layer over said coating, the improvement comprising:

means for electrically coupling said conductive coating and said external conducting member through a localized region of said insulative layer.

2. The improvement according to claim 1 wherein said means for coupling comprises a conductive protuberance on the external surface of said envelope which extends through said insulative layer and is adapted for electrically contacting said electrical conducting member.

3. The improvement according to claim 2 wherein said envelope is comprised of glass and said protuberance comprises a glass bead secured to said envelope and having said conductive coating thereon.

4. The improvement according to claim 1 wherein said means for coupling comprises a conductive wire secured at one end to said conductive coating on said envelope, said wire having a second end extending through said protective layer and adapted for electrically contacting said electrical conducting member.

5. The improvement according to claim 4 wherein said conductive wire is comprised of copper.

6. The improvement according to claim 1 wherein said means for coupling comprises a slit within said protective layer extending from the other surface of said layer to said conductive coating on said envelope, and a quantity of conducting material within said slit in engagement with said conductive coating, a portion of said conducting material extending from said slit and adapted for electrically contacting said electrical conducting member.

7. The improvement according to claim 6 wherein said conducting material is a conductive paint.

8. The improvement according to claim 1 wherein said means for coupling comprises an electrically conductive pin extending a predetermined distance within said protective layer sufficient to permit electrical breakdown between said pin and said conductive layer on said envelope, said pin having an end portion protruding from said protective layer and adapted for electrically contacting said electrical conducting member.

9. The improvement according to claim 8 wherein said pin is comprised of copper.

10. The improvement according to claim 1 wherein said envelope is comprised of glass, said conductive coating is selected from the group consisting of tin oxide and indium oxide, and said protective layer is cellulose acetate.

* * * * *